United States Patent
Parbhane et al.

(10) Patent No.: US 10,824,547 B2
(45) Date of Patent: Nov. 3, 2020

(54) AUTOMATED CERTIFICATION TESTING FOR APPLICATION DEPLOYMENT

(71) Applicant: ServiceNow, Inc., Santa Clara, CA (US)

(72) Inventors: Prashant Nanasaheb Parbhane, Santa Clara, CA (US); Chirag Bagdai, Rajkot (IN); Saraja Panda, Hyderabad (IN); Nagarani Racharla, Hyderabad (IN); Damodar Reddy Palagiri, Hyderabad (IN); Saurabh Khetan, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/126,894

(22) Filed: Sep. 10, 2018

(65) Prior Publication Data

US 2020/0081825 A1 Mar. 12, 2020

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01); *G06F 11/3692* (2013.01)

(58) Field of Classification Search
CPC ............. G06F 11/3664; G06F 11/3688; G06F 11/3692
USPC ................................................. 717/120–126
See application file for complete search history.

(56) References Cited

U.S. PATENT DOCUMENTS

| | | |
|---|---|---|
| 6,321,229 B1 | 11/2001 | Goldman |
| 6,678,887 B1 | 1/2004 | Hallman |
| 6,816,898 B1 | 11/2004 | Scarpelli |
| 7,020,706 B2 | 3/2006 | Cates |
| 7,337,429 B1 | 2/2008 | Psaras et al. |
| 7,716,353 B2 | 5/2010 | Golovinsky |

(Continued)

OTHER PUBLICATIONS

Techopedia, "Baseline", 2017, retrieved from https://www.techopedia.com/definition/6148/baseline , 1 page (Year: 2017).*

(Continued)

*Primary Examiner* — Ted T. Vo
(74) *Attorney, Agent, or Firm* — Fletcher Yoder PC

(57) ABSTRACT

An example system includes a first computational instance configured to provide a version of a computational environment for test execution for a software application and a second computational instance storing representations of a plurality of available certification tests adapted to test software applications executing in a plurality of different versions of the computational environment. The second computational instance is configured to receive a request for certification tests for the software application; determine a subset of certification tests, selected from the plurality of available certification tests, to evaluate the software application within the version of the computational environment provided by the first computational instance; and transmit representations of the subset of certification tests. After reception of the representations, the first computational instance is configured to: execute the subset of certification tests against the software application and, based on outcomes of executing the subset, generate a report of certification test results.

20 Claims, 11 Drawing Sheets

(56) References Cited

U.S. PATENT DOCUMENTS

| | | |
|---|---|---|
| 7,769,718 B2 | 8/2010 | Murley |
| 7,925,981 B2 | 4/2011 | Pourheidari |
| 8,151,261 B2 | 4/2012 | Sirota |
| 8,191,047 B2 | 5/2012 | Weiss |
| 8,402,127 B2 | 3/2013 | Solin |
| 8,612,408 B2 | 12/2013 | Trinon |
| 8,646,093 B2 | 2/2014 | Myers |
| 8,832,652 B2 | 9/2014 | Mueller |
| 9,020,925 B2* | 4/2015 | Li ............... G06F 21/577 707/706 |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,612,812 B2* | 4/2017 | Arcilla ............... G06F 21/57 |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 9,819,729 B2 | 11/2017 | Moon |
| 9,973,375 B2* | 5/2018 | Shatzkamer ............ G06F 9/455 |

OTHER PUBLICATIONS

Applied BioSystem, "Data Analysis on the ABI PRISM® 7700 Sequence Detection System: Setting Baselines and Thresholds", 2002, Applied Biosystems, 12 pages (Year: 2002).*

Microsoft Docs, "The app certification process", 2017, retrieved from https://web.archive.org/web/20170907091408/, 2 pages (Year: 2017).*

Prashant Parbhane; Chirag Bagdai; Saraja Panda; Nagarani Racharla; Damodar Reddy Palagiri; Saurabh Khetan, Latest Release of Certification Self-Test Tool is Launched!, ServiceNow Community Blog, Published Apr. 27, 2018, https://community.servicenow.com/community?id=community_blog&sys_id=613d9524dbb95f80fc5b7a9e0f96195d&view_source=searchResult:,7 Pages.

* cited by examiner

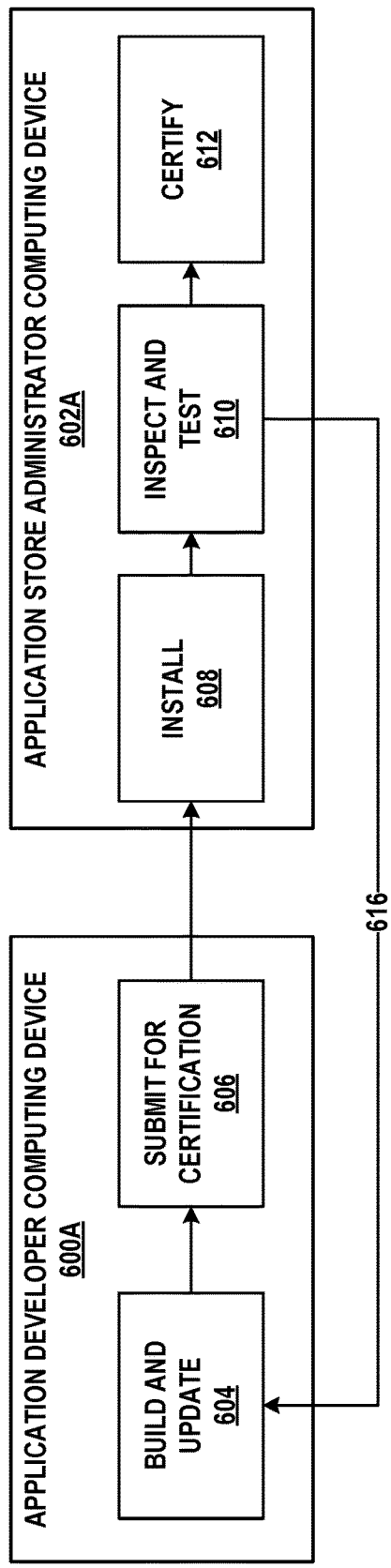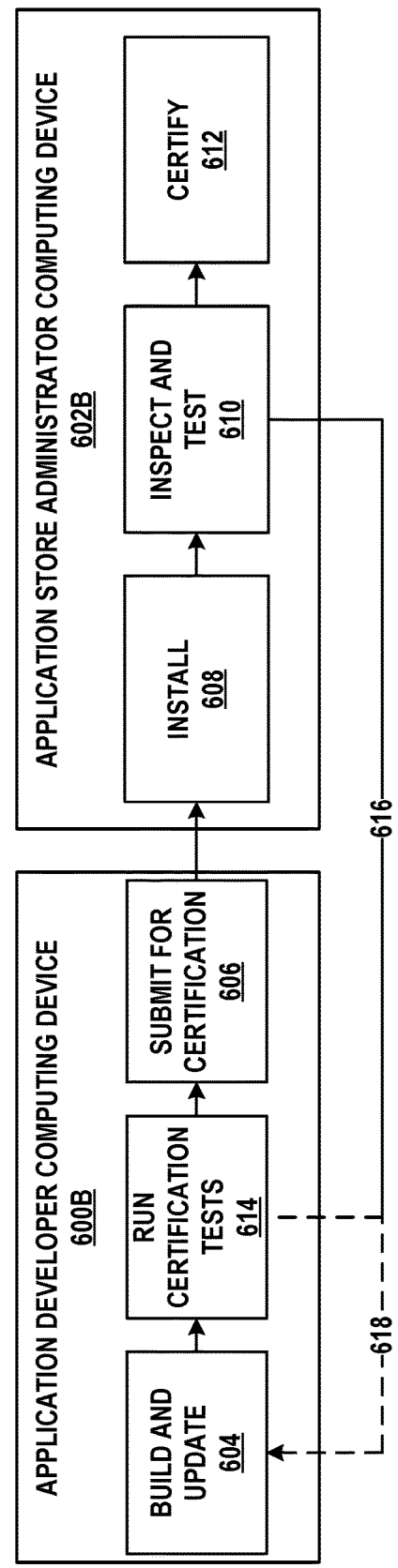

| COMPUTATIONAL ENVIRONMENT VERSION 900 | COMPUTATIONAL ENVIRONMENT VERSION 912 | COMPUTATIONAL ENVIRONMENT VERSION 924 | COMPUTATIONAL ENVIRONMENT VERSION 936 |
|---|---|---|---|
| CERT. TEST 902 PLUGINS TESTED: NONE | CERT. TEST 914 PLUGINS TESTED: NONE | CERT. TEST 926 PLUGINS TESTED: 925, 927 | CERT. TEST 938 PLUGINS TESTED: 937, 939 |
| CERT. TEST 904 PLUGINS TESTED: NONE | CERT. TEST 916 PLUGINS TESTED: NONE | CERT. TEST 928 PLUGINS TESTED: NONE | CERT. TEST 940 PLUGINS TESTED: NONE |
| CERT. TEST 906 PLUGINS TESTED: NONE | CERT. TEST 918 PLUGINS TESTED: 917, 919 | CERT. TEST 930 PLUGINS TESTED: NONE | CERT. TEST 942 PLUGINS TESTED: NONE |
| CERT. TEST 908 PLUGINS TESTED: 909 | CERT. TEST 920 PLUGINS TESTED: NONE | CERT. TEST 932 PLUGINS TESTED: 933 | CERT. TEST 944 PLUGINS TESTED: NONE |
| ... | ... | ... | ... |
| CERT. TEST 910 PLUGINS TESTED: 911 | CERT. TEST 922 PLUGINS TESTED: 923 | CERT. TEST 934 PLUGINS TESTED: NONE | CERT. TEST 946 PLUGINS TESTED: NONE |

FIG. 9

AUTOMATED CERTIFICATION TESTING FOR APPLICATION DEPLOYMENT

BACKGROUND

Software applications provided in an application store of an application platform may be developed by multiple different software development teams. While some of the software development teams may be affiliated with the application platform, many may be independent third parties. Accordingly, these different software development teams may use different programming styles, conventions, standards, and best practices. In some cases, such differences may result in one software application being better adapted for the application platform than another.

To improve the quality and consistency of software applications available via the application store, each of the software applications may be subject to a plurality of certification tests configured to verify that a respective software application meets the application platform's minimum programming standards, conventions, styles, and best practices. Such application certification may increase the likelihood that the software applications available via the application store are properly configured to operate on the application platform, correctly utilize the application platform's features, and successfully coordinate with other software applications running on the application platform.

SUMMARY

A certification process for a software application often involves a developer of the software application transmitting the software application from a computing device on which the application was developed and tested to a computing device associated with an application store administrator. The software application may be installed on the computing device associated with the application store administrator and a plurality of certification tests may be executed thereon against the software application. The certification tests may be configured to review the source code of the software application and execute the software application to evaluate its behavior and output in response to various test inputs. Some issues, errors, or warnings generated by the certification tests may preclude certification of the software application until they are resolved. Accordingly, these issues, errors, or warnings may be transmitted back to the software developer's computing device to be addressed or resolved in an updated or revised version of the software application.

This certification and revision process may take a significant amount of time due development and testing taking place on different computing devices or systems. The certification process may be further prolonged when it involves the application store administrator's active participation (e.g., manual code review) and when multiple rounds of revisions are required. Additionally, in some cases, the computing device associated with the software developer and the computing device associated with the application store administrator may use different versions of a computational environment. Thus, the software application might be tested in a computational environment different from the computational environment in which it was developed, resulting in errors or warnings caused by incompatibilities between the software application and the computational environment in which it is being tested, thereby adding more time to the application certification process. However, the amount of time needed to certify a software application for inclusion in an application store or other software distribution means may be reduced by modifying this application certification process.

In one example, the software application may be developed by the software developer within a first computational instance of a remote network management platform while a second computational instance of the remote network management platform may be used by the application store administrator to manage and distribute the certification tests. Alternatively, the software developer may use a first computing device having a different version of a computational environment than a second computing device used by the application store administrator. The first and second computational instances may each provide a different version of a computational environment. After the software application is developed, rather than being transmitted to the second computational instance for testing, the software developer may instead request a plurality of certification tests to be transmitted to the first computational instance to test the software application. These certification tests may be selected from a larger pool of certification tests based on a version of the computational environment provided by the first computational instance. Thus, the transmitted plurality of certification tests may be adapted to execute in the version of the computational environment provided by the first computational instance.

After reception of the plurality of certification tests by the first computational instance, these certification tests may be executed thereby against the software application to identify any aspects of the software application that do not conform to the remote network management platform's rules and standards. Based on the results of the certification testing, the software application may be revised and retested using the first computational instance. Notably, this portion of the testing and revision process may be performed within the first computational instance without additional input by the second computational instance or the application store administrator. Thus, the amount of time needed for testing and revision may be reduced since the software application does not need to be transmitted, installed, and/or inspected by a party other than the software developer. Additionally, because (i) the software application is tested in its native environment and (ii) each of the certification tests used to test the software application is adapted to this native environment, the likelihood of encountering errors in the testing process itself (rather than errors in the design of the software application) is reduced.

With each round of certification testing, the first computational instance may generate a report of certification test results containing any errors or warnings generated by the tests, execution times of the tests, and computing resource usage by the test, among other performance parameters. This report may be transmitted back to the second computational instance which may use the report to modify the set of certification tests mapped to the version of the computational environment of the first computational instance to be used in future testing, modify the certification tests themselves, identify any frequently-failed certification tests, and generate suggested solutions for common errors in the frequently-failed certification tests, among other operations.

Once at least a threshold number of the certification tests are passed by the software application, the software application may be approved for official certification testing. Official certification testing may be performed by a third computational instance that has an identical or similar version of the computational environment as the first computational instance. The official certification testing may involve execution of the plurality of certification tests that have been transmitted to and executed by the first computational instance, as well as execution of additional certification tests that have not yet been executed against the software application. The additional certification tests may test for adherence to additional rules or standards set forth by the remote network management platform, or may simply retest for adherence to rules and standards that have already been tested by the first computational instance, thus providing redundancy to the testing process. Accordingly, when at least the threshold number of the certification tests is passed by the software application on the first computational instance, the software application may be transmitted to the third computational instance for official certification testing.

Similarly, official certification testing may involve identifying and correcting any errors or warnings resulting from execution of the certification tests. Notably, the official certification process may involve some coordination between the software developer and certification testers evaluating the software application using the third computational instance. However, since many potential issues are likely to have already been resolved as a result of the initial certification testing performed on the first computational instance, the amount of coordination and back-and-forth is likely to be much smaller than it would otherwise be without the initial certification testing. Once the software application passes at least a second threshold number of certification tests, the third computational instance may approve the software application for inclusion in and distribution via the application store.

Accordingly, a first example embodiment may involve a computing system that includes a first computational instance of a remote network management platform configured to provide a version of a computational environment for development of and test execution for a software application. The computing system may also involve a second computational instance of the remote network management platform storing representations of a plurality of available certification tests adapted to test software applications executing in a plurality of different versions of the computational environment. The second computational instance is configured to receive, from the first computational instance, a request for certification tests for the software application. The second computational instance is also configured to determine a subset of certification tests to evaluate the software application within the version of the computational environment provided by the first computational instance. The subset of certification tests are selected from the plurality of available certification tests. The second computational instance is additionally configured to transmit, to the first computational instance, representations of the subset of certification tests. The first computational instance is configured to, after reception of the representations of the subset of certification tests: (i) execute the subset of certification tests against the software application and (ii) based on outcomes of executing the subset of certification tests, generate a report of certification test results.

In a second example embodiment, a method may involve receiving, by a second computational instance of a remote network management platform and from a first computational instance of the remote network management platform, a request for certification tests for a software application. The first computational instance is configured to provide a version of a computational environment for development of and test execution for the software application. The second computational instance stores representations of a plurality of available certification tests adapted to test software applications executing in a plurality of different versions of a computational environment. The method may also involve determining, by the second computational instance, a subset of certification tests to evaluate the software application within the version of the computational environment provided by the first computational instance. The subset of certification tests are selected from the plurality of available certification tests. The method may additionally involve transmitting, by the second computational instance and to the first computational instance, representations of the subset of certification tests. The method may further involve, after reception of the representations of the subset of certification tests by the first computational instance, executing, by the first computational instance, the subset of certification tests against the software application. The method may yet further involve based on outcomes of executing the subset of certification tests, generating, by the first computational instance, a report of certification test results.

In a third example embodiment, an article of manufacture may include a non-transitory computer-readable medium, having stored thereon program instructions that, upon execution by a computing system, cause the computing system to perform operations. The operations may involve receiving, by a second computational instance of the computing system and from a first computational instance of the computing system, a request for certification tests for a software application. The first computational instance is configured to provide a version of a computational environment for development of and test execution for the software application. The second computational instance stores representations of a plurality of available certification tests adapted to test software applications executing in a plurality of different versions of a computational environment. The operations may also involve determining, by the second computational instance, a subset of certification tests to evaluate the software application within the version of the computational environment provided by the first computational instance. The subset of certification tests are selected from the plurality of available certification tests. The operations may additionally involve transmitting, by the second computational instance and to the first computational instance, representations of the subset of certification tests. The operations may further involve, after reception of the representations of the subset of certification tests by the first computational instance, executing, by the first computational instance, the subset of certification tests against the software application. The operations may yet further involve, based on outcomes of executing the subset of certification tests, generating, by the first computational instance, a report of certification test results.

In a fourth example embodiment, a computing system may include at least one processor, as well as memory and program instructions. The program instructions may be stored in the memory, and upon execution by the at least one processor, cause the computing system to perform operations. The operations may involve receiving, by a second computational instance of the computing system and from a first computational instance of the computing system, a request for certification tests for a software application. The first computational instance is configured to provide a version of a computational environment for development of and test execution for the software application. The second computational instance stores representations of a plurality of available certification tests adapted to test software applications executing in a plurality of different versions of a computational environment. The operations may also involve determining, by the second computational instance, a subset of certification tests to evaluate the software application within the version of the computational environment provided by the first computational instance. The subset of certification tests are selected from the plurality of available certification tests. The operations may additionally involve transmitting, by the second computational instance and to the first computational instance, representations of the subset of certification tests. The operations may further involve, after reception of the representations of the subset of certification tests by the first computational instance, executing, by the first computational instance, the subset of certification tests against the software application. The operations may yet further involve, based on outcomes of executing the subset of certification tests, generating, by the first computational instance, a report of certification test results.

In a fifth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts a software application certification process, in accordance with example embodiments.

FIG. 6B depicts a software application certification process, in accordance with example embodiments.

FIG. 9 depicts a mapping between computational environment versions and certification tests, in accordance with example embodiments.

DETAILED DESCRIPTION

Figure 1:
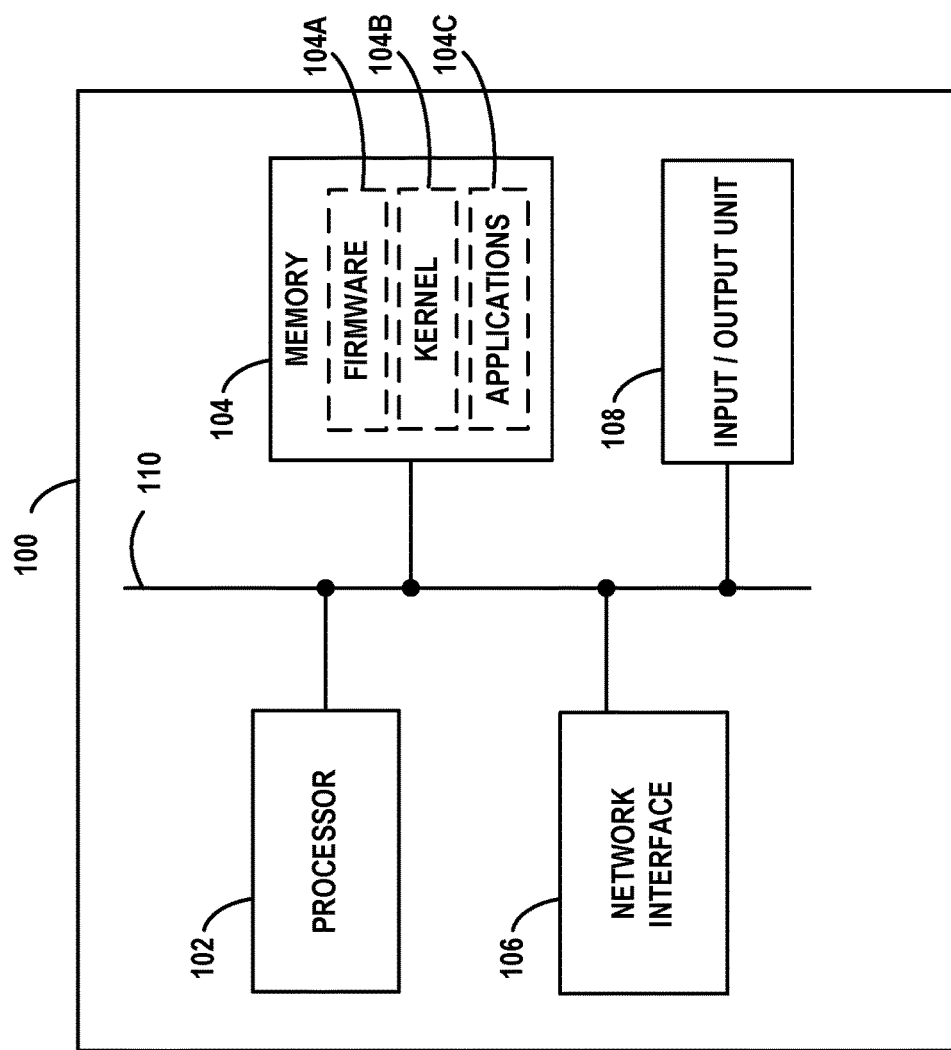
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
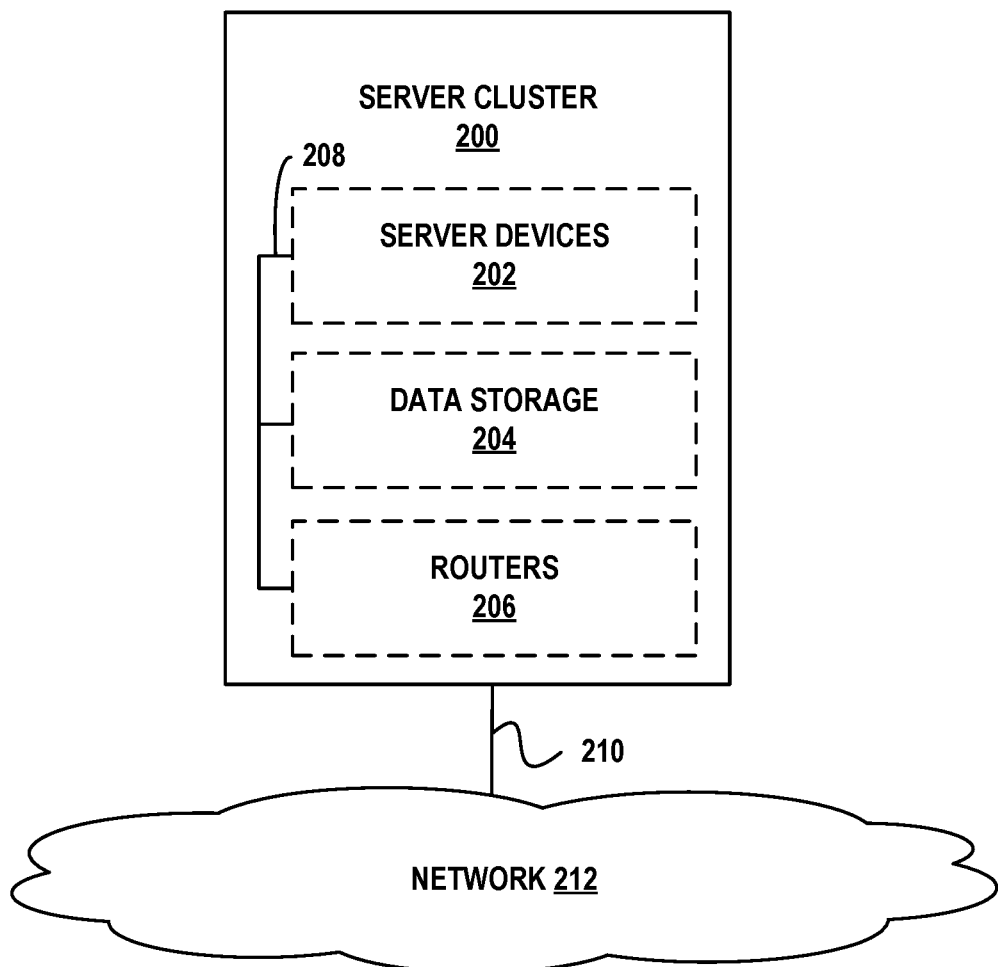
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
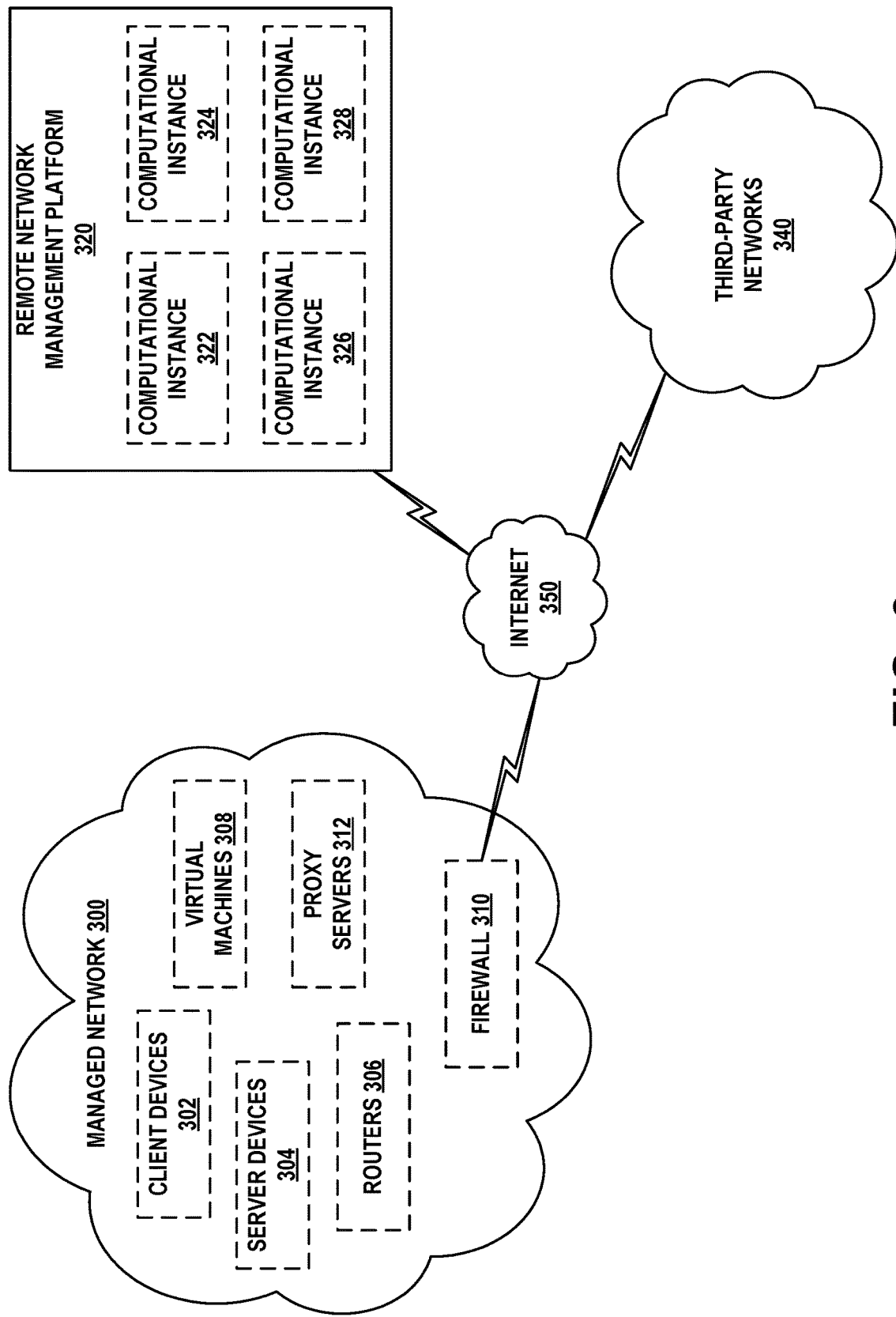
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
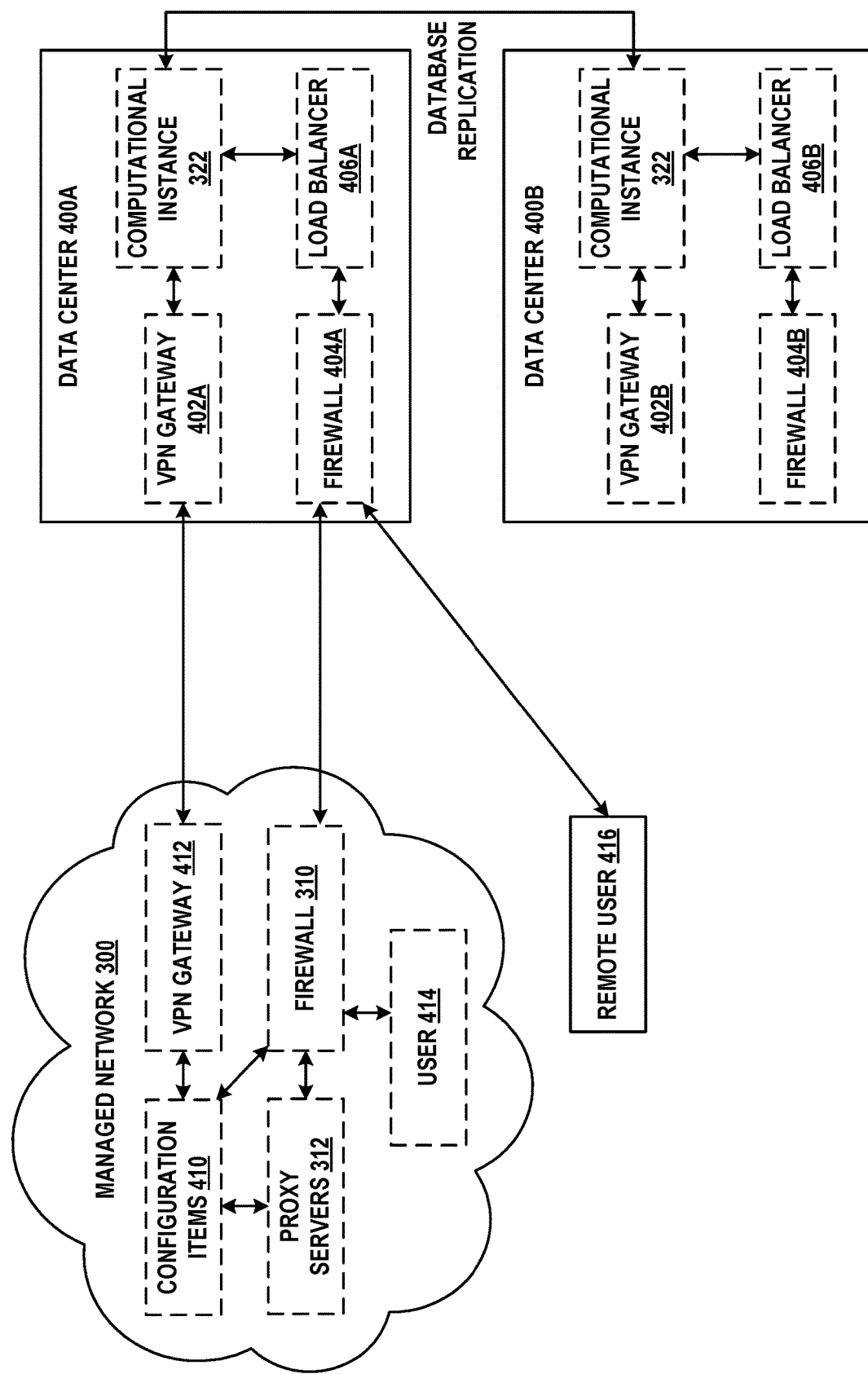
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
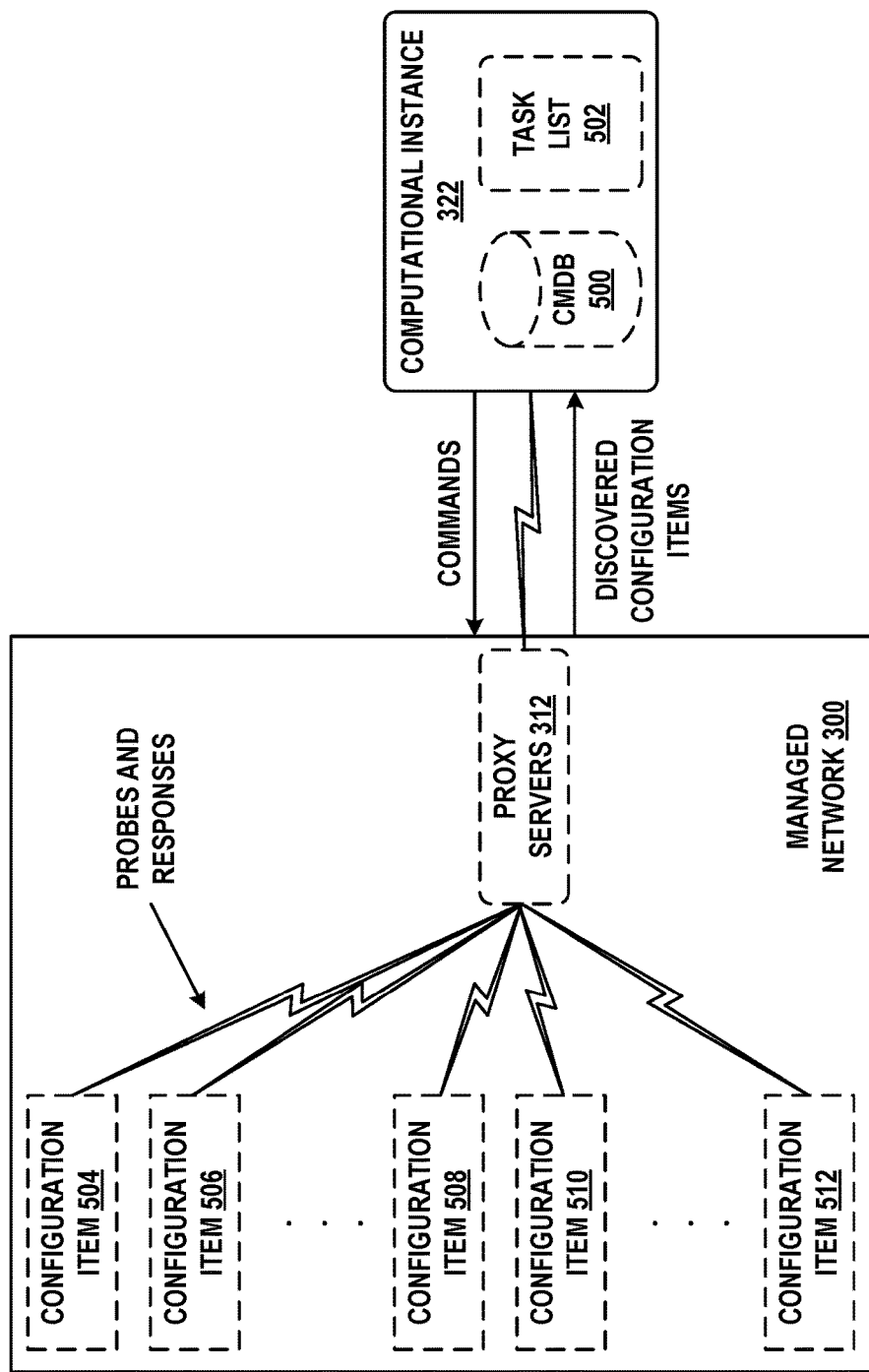
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
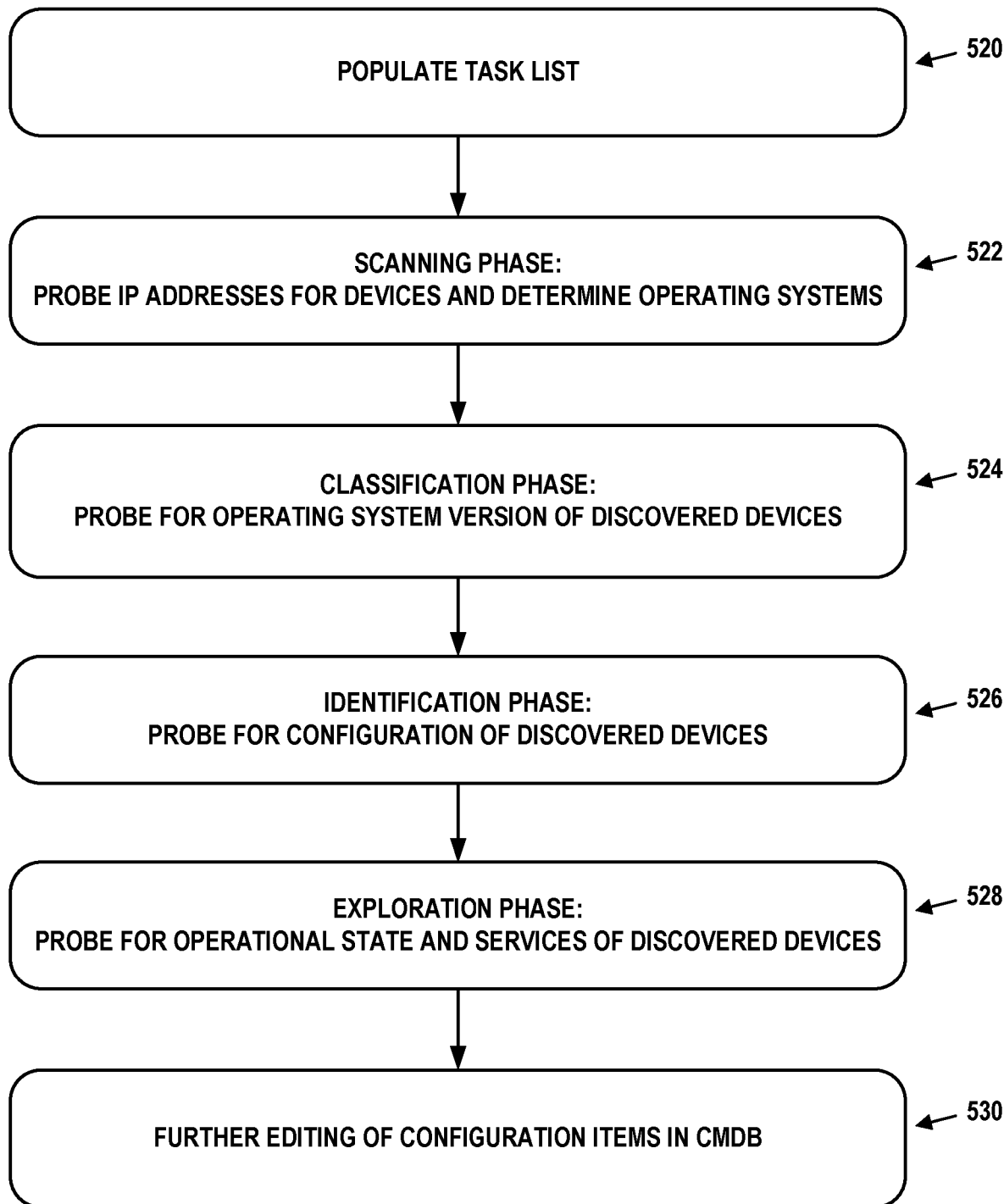
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Application Certification Testing

Before a software application is made available in an application store or similar software distribution mechanism of an application platform, the application may undergo certification testing to determine whether the application conforms to rules and standards defined for the application platform. The certification tests may verify, for example, that the software application utilizes computing and network resources provided by the application platform (e.g., plugins, application programming interfaces, heap memory, etc.) in an appropriate manner, successfully cooperates with other software applications, uses shared databases appropriately, does not contain malicious code, does not contain inappropriate content, respects a user's privacy settings, and does not contain critical defects (e.g., does not crash or lock-up), among other aspects of the software application.

FIG. 6A illustrates an example certification process for a software application. Application developer computing device 600A (e.g., a computing device utilized by an application developer) is first used to generate, implement, build, and/or update the application, as illustrated by block 604. Once the desired functionality has been implemented in the application, the application is submitted for certification, as illustrated by block 606, to application store administrator computing device 602A (e.g., a computing device used by an application store administrator). Application store administrator computing device 602A installs the application, as indicated by block 608, and inspects and tests the application, as indicated by block 610. The inspection and testing may involve executing various certification tests against the software application to analyze the software application statically, by, for example, reviewing the source code of the application, as well as dynamically, by executing the software application and monitoring its behavior. Some certification tests may parse the source code to identify any coding patterns that do not conform to the application platform's rules and standards. Other certification tests may provide one or more inputs to the software application, monitoring the application's behavior in response to the one or more inputs, and monitor the application's corresponding one or more outputs to determine whether the application's behavior and outputs match or conform to the application platform's standards and rules. The inspection and testing may also involve a manual review (e.g., by a human computer programmer) of the software application's source code and dynamic behavior.

If the application passes the inspection and testing at block 610, the application is certified, as indicated by block 612. The application may be included in an application store from which the application may be downloaded and executed by various computing devices. However, if the application fails the inspection and testing at block 610, the application may be sent back to application developer computing device 600A, as indicated by arrow 616, to be refined and revised until the application conforms to the rules and standards of the application platform. Once the application is revised, the process illustrated by blocks 606, 608, and 610 may again be repeated until the application is successfully certified.

However, such coordination between application developer computing device 600A and application store administrator computing device 602A to certify the application may be time consuming and may thus increase the time it takes to publish the software application in the application store. Additionally, a first computational environment version used by application developer computing device 600A may be different from a second computational environment version used by application store administrator computing device 602A. Differences between the first computational environment version in which the application is developed and the second computational environment version in which the application is tested may cause the software application to behave differently during testing than during development, thus resulting in the application potentially failing some certification tests in the second computational environment version that the software application would not otherwise fail in the first computational environment version. The differences between the computational environments in which the software application is developed and tested may add further delays to publication of the software application, and may make identification of errors in the software application more difficult.

FIG. 6B illustrates an example software certification process that can reduce the certification time of the software application by modifying the software certification process shown in FIG. 6A. As in FIG. 6A, application developer computing device 600B is first used to generate, implement, build, and/or update the software application, as indicated by block 604. However, rather than transmitting the software application to application store administrator computing device 602B for certification testing, application developer computing device 600B first requests, from application store administrator computing device 602B, a plurality of certification tests. After receiving the plurality of certification test, application developer computing device 600B may run the certification tests against the software application without involvement by application store administrator computing device 602B, as indicated by block 614. Thus, a portion of the certification testing process may be carried out by application developer computing device 600B, rather than application store administrator computing device 602B.

When one or more of the certification tests fail or issue warnings, application developer computing device 600B may be used to refine the software application, as indicated by dashed line 618, until the software application passes at least a threshold number of the certification tests that have been provided by application store administrator computing device 602B. Thus, application developer computing device 600B may be used to find and correct errors in the software application in a shorter amount of time due to not having to rely on application store administrator computing device 602B for execution of the certification tests already provided thereby. Once the software application passes at least the threshold number of certification tests, application developer computing device 600B may submit the application for official certification testing by application store administrator computing device 602B, as indicated by block 606.

The threshold number of tests may be a predetermined number of tests, a percentage of tests sent to application developer 602B, or a list of specific tests, among other possibilities. Notably, due to prior testing by application developer computing device 600B, the software application may be more likely to successfully pass certification tests executed by application store administrator computing device 602B against the software application, thus decreasing the amount of retesting and the amount of time dedicated to certification testing by application store administrator computing device 602B. Accordingly, application store administrator computing device 602B may be able to respond faster to requests for official certification testing of a software application.

Providing the certification tests to application developer computing device 600B thus does not eliminate the role of application store administrator computing device 602B in the application certification process. Rather, providing the certification tests to application developer computing device 600B allows for a portion of the certification process to be carried out without involvement by application store administrator computing device 602B by having application developer computing device 600B independently test the software application. Application store administrator computing device 602B may, however, continue to administer the official certification testing needed to have a software application approved for inclusion in the application store. The official certification testing is more likely to be quicker, generating fewer errors, due to many of these errors having already been resolved by application developer computing device 600B in response to the independent certification testing carried out at block 614.

Once independent testing by application developer computing device 600B is completed, application store administrator computing device 602B may install the software application, as indicated by block 608, and inspect and test the software application, as indicated by block 610. The inspection and testing by application store administrator computing device 602B may involve (i) executing the certification tests that have already been provided to and executed by application developer computing device 600B and (ii) executing additional certification tests that have not been shared with application developer computing device 600B. Application store administrator computing device 602B may thus (i) verify that application developer computing device 600B successfully tested and refined the software application to conform to the certification tests shared with application developer computing device 600B and (ii) verify that the software application adheres to any additional standards or rules not yet tested by application developer computing device 600B. Application store administrator computing device 602B might not share some certification tests with application developer computing device 600B to, for example, reduce the possibility of application developer computing device 600B being used to develop the software application to pass the certification test but otherwise not adhere to the standards and rules of the application platform (e.g., to "game the system").

If the inspection and testing by application store administrator computing device 602B uncovers errors, warnings, or other potential defects, application store administrator computing device 602B may request that application developer computing device 600B be used to refine or update the software application, as indicated by arrow 616, and repeat the certification process on the updated application. However, by having application developer computing device 600B independently test and refine the software application before submitting the software application to application store administrator computing device 602B for testing, the software application will be more likely to pass a greater number of the certification tests. As a result, the software application may require fewer iterations of testing and redevelopment, thereby reducing the time to application publication in the application store. Once the software application passes a satisfactory number of certification tests (e.g., all the certification tests, at least a threshold number of certification tests such as 90%, a specific list of certification tests), the software application may be certified for inclusion, provision, and distribution via the application store, as indicated by block 612.

In some implementations, application developer computing device 600B and application store administrator computing device 602B may each represent different and separate computing systems. For example, application developer computing device 600B may represent client device 302 of managed network 300, as shown in FIG. 3, while application store administrator computing device 602B may represent computational instance 328 of remote network management platform 320. Accordingly, application developer computing device 600B may provide a specific version of a computational environment for the software application that may be different from a version of the computational environment utilized by application store administrator computing device 602B. The version of the computational environment may be characterized by a specific type of operating system (e.g., WINDOWS®, LINUX®, MACOS®), a specific version, release, or variant of the operating system (e.g., WINDOWS® 7, LINUX® FEDORA®, MACOS® X), and/or a combination of software plugins available in the computational environment, among other variable characteristics.

However, application developer computing device 600B and application store administrator computing device 602B may also represent the same or similar computing systems. For example, application developer computing device 600B may represent computational instance 322 of remote network management platform 320, as shown in FIG. 3, and application store administrator computing device 602B may represent computational instance 328. Nevertheless, computational instance 322 may provide a specific version of a computational environment for the software application that may be different from a version the computational environment provided by computational instance 328. For example, each of computational instances 322 and 328 may be operating a specific release of an application management software (e.g., an application management web platform) associated with the application platform and/or a combination of different optional software plugins available in the computational environment, among other variable characteristics.

The certification tests provided by application store administrator computing device 602B may thus be selected based on and may be adapted to test software applications in the version of the computational environment provided by application developer computing device 600B. As a result, application development may be focused on developing and testing the software application, rather than resolving errors resulting from incompatibilities between the certification tests and the computational environment in which the certification tests are executed. Notably, the operations described herein may be performed automatically (i.e., without human involvement) or semi-automatically (i.e., with some human involvement).

Figure 7:
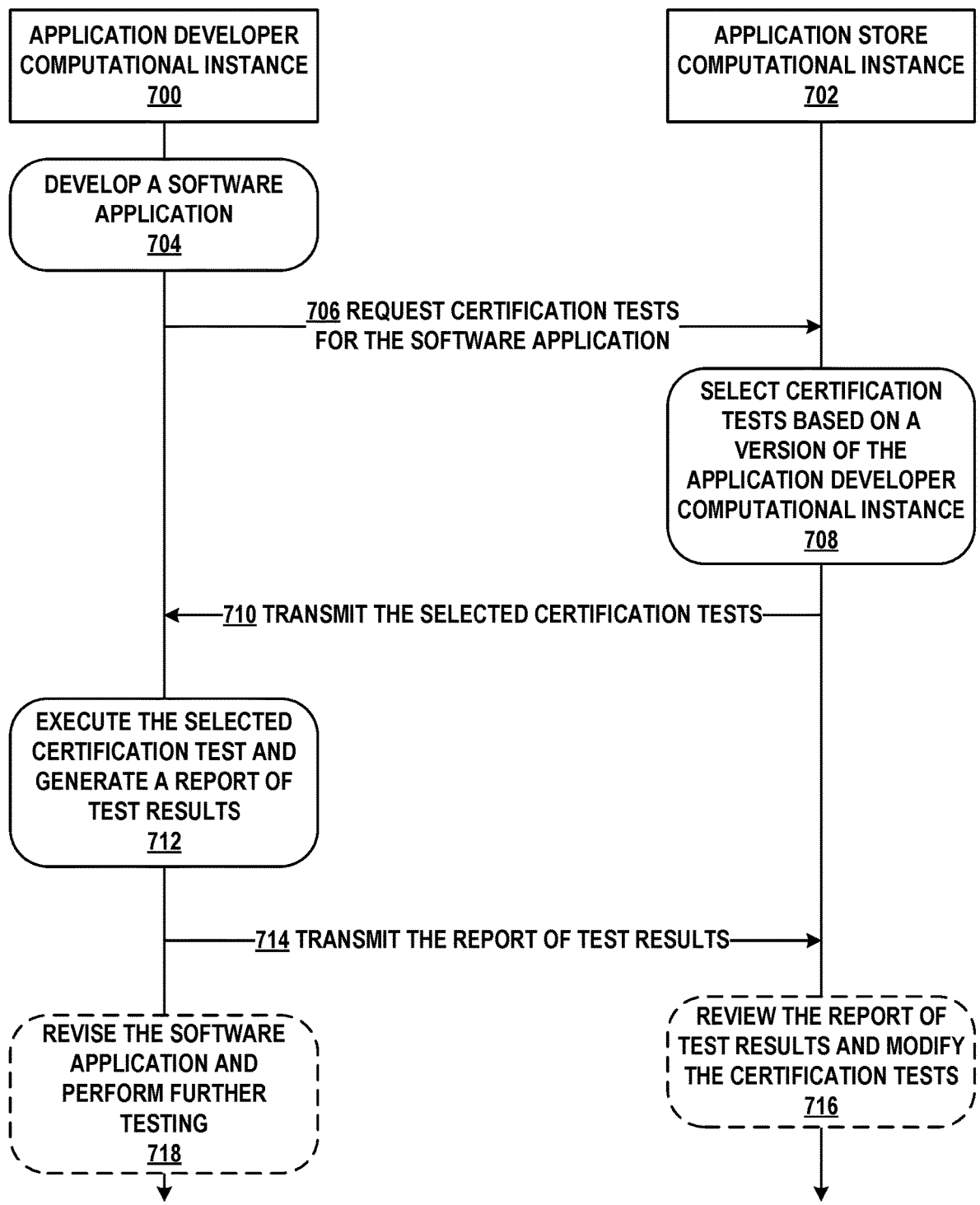
FIG. 7 is a message flow diagram, in accordance with example embodiments.

FIG. 7 illustrates a message flow diagram between application developer computational instance 700 (e.g., a computational instance assigned to and used by an application developer) and application store computational instance 702 (e.g., a computational instance assigned to and used by an application store administrator). Computational instances 700 and 702 may each be computational instances of remote network management platform 320. However, in alternative implementations, computational instances 700 and 702 may also represent any two different computing devices, computing systems, or portions of a computing system configured to carry out the operations described herein (e.g., application developer computing device 600B and application store administrator computing device 602B, respectively).

Application developer computational instance 700 may be used to develop a software application, as indicated by block 704. After the software application is developed, computational instance 700 may transmit, to computational instance 702, a request for certification tests for the developed software application, as indicated by arrow 706. The request may be transmitted in response to a user input provided to computational instance 700 via a user interface and indicating to request the certification tests. Alternatively, the request may be transmitted automatically or semi-automatically. The request for certification tests may include therein information identifying a version of the computational environment provided by computational instance 700 as well as information specific to the software application to be certified.

For example, the information identifying the version of the computational environment may include a release or version of computational instance 700, an operating system of computational instance 700, hardware on which computational instance 700 is being executed, a version of a software used by computational instance 700 to manage and execute the certification tests, and/or plugins that are active in computational instance 700, among other properties associated with computational instance 700. Additionally, the information specific to the software application to be certified may include data identifying plugins that are actually utilized by the software application, software libraries used by the software application, or whether portions of the software application are parallelizable, among other properties. Notably, the request might not include therein the software application itself since computational instance 702 might not be executing the certification tests against the software application (at least until computational instance 700 executes and passes some of the certification tests first).

In response to receiving the request for certification tests from computational instance 700, computational instance 702 may select, from a plurality of available certification tests, a subset of the plurality of certification tests based on the version of the computational environment provided by application developer computational instance 700, as indicated by block 708. Computational instance 702 may also select the subset of the plurality of certification tests based on the information specific to the software application. The plurality of available certification tests may be configured for execution in and for testing of applications in a plurality of different versions of the computational environment. By selecting the appropriate subset of certification tests for the version of the computational environment provided by computational instance 700, the number of testing errors caused by incompatibility between a certification test and the version of the computational environment may be reduced. Accordingly, software developers may avoid attempting to resolve certification errors that are not actually caused by any deficiency in the software application, but rather by a certification test not working correctly in a given version of the computational environment.

In some implementations, the subset of certification tests may additionally include one or more trial certification tests. A trial certification test may be a certification test that the software application does not have to pass to become certified but that is executed against the software application to gather data about how the trial certification test performs. The trial certification test may be revised and updated before it graduates from the trial period and starts getting used as a normal certification test.

Computational instance 702 may also generate and store, in a database, a record of the request received from computational instance 700 and the subset of certification tests that was selected for the version of the computational environment of computational instance 700. This record may be later used to verify that all of the provided certification tests were executed and/or passed, or to revise the subset of certification tests for a particular version of the computational environment, among other possibilities.

Computational instance 702 may transmit the selected subset of certification tests to computational instance 700 for execution thereby against the software application, as indicated by arrow 710. In some implementations, the transmission may include the source code of the subset of certification tests, but might not include any software libraries or software library functions on which the certification tests rely for or invoke during execution. Instead, since the subset of certification tests is adapted to execute on the version of the computational environment of computational instance 700, any software libraries or library functions needed by the subset of certification tests may already be present on computational instance 700. Accordingly, the size of the transmission may be reduced. Nevertheless, in some cases, any libraries or library functions may be transmitted to computational instance 700 along with the subset of certification test, either as source code, as a compiled object file, or as a compiled binary file.

Computational instance 700 may, based on or in response to receiving the subset of the certification tests, execute the selected subset of certification tests against the software application, as indicated by block 712. The subset of certification tests may be compiled before execution when the subset of certification tests has been provided as source code rather than pre-compiled binary code. Computational instance 700 may additionally generate a report of results of execution of the subset of certification tests. The report may indicate whether a test passed, failed, or generated a warning, any outputs generated by the certification test or the software application during execution, a length of time each test took to execute, and/or computing resources used by each test, among other information.

The report of certification test results may be transmitted to computational instance 702, as indicated by arrow 714. Computational instance 702 may be configured to review the report and, optionally, based thereon, verify that each test of the initially-transmitted subset has been executed, modify the subset of certification tests used for a particular version of the computational environment, modify the certification tests themselves, identify one or more frequently-failed certification tests, generate and provide suggested solutions for any frequently-failed certification tests, and/or gather statistics and other data describing the execution of the certification tests (e.g., execution time. memory usage), as indicated by block 716.

For example, the report may indicate that a particular certification test called or invoked an operating system function that was not recognized by computational instance 700. Computational instance 702 may thus determine that the particular certification test contains an error, is not actually adapted to the version of the computational environment provided by computational instance 700, or is otherwise deficient, and may responsively remove the particular certification test from the subset of certification tests to be provided for certification testing to computational instance 700 at future times. Alternatively or additionally, computational instance 702 may generate a message indicating to a programmer that the particular certification test needs to be modified to tailor it to the version of the computational environment of computational instance 700.

Further, in some cases, computational instance 702 may be configured to automatically modify the particular certification test based on the report. For example, the report may indicate that portions of the certification test are not applicable to a given software application. The certification test might thus be modified to remove therefrom the portions that are not applicable. Portions of code may be removed by, for example, being automatically commented out by computational instance 702. The updated certification test may be transmitted to computational instance 700 to be used in subsequent tests of the given software application (but not other software applications that might use the removed portions of the certification test).

Computational instance 702 may also be configured to use the report to distinguish between errors within source code of a certification test and errors within source code of the software application. The report may, for example, indicate whether the certification test or the software application called a function (e.g., system function, library function) that is not available within the version of the computational environment provided by computational instance 700, thereby resulting in generation of an error. Notably, some errors (e.g., more complex errors) might not be automatically attributable to the certification test or the software application based on the report alone without performing additional (e.g., manual) investigation or debugging.

In response to detecting an error within the certification test, computational instance 702 may be configured to generate a message (e.g., an email or push notification) indicating the presence and possibly the source of the error. The generated message may be transmitted to a computing device associated with a software developer (e.g., application store administrator), thus prompting the error to be addressed by the software developer. Additionally, before the error is addressed by the software developer, for example, computational instance 702 may be configured to remove the certification test containing the error from the subset of certification tests that is used by computational instance 700 to test the software application. Computational instance 702 may be configured to transmit to computational instance 700 the updated subset of certification tests, thus allowing computational instance 700 to continue the certification testing process without having to address an error caused by a certification test, rather than the software application under test, and which thus might not be easily corrected by the developer of the software application unfamiliar with the certification tests.

Computational instance 702 may additionally use the report to track execution times and computing resource usage, among other performance parameters, of the different certification tests. Based on tracking the execution times of the certification tests across a plurality of different software applications, computational instance 702 may be configured to determine expected execution times for each certification test. Similarly, based on tracking the computing resource usage of the certification tests across a plurality of different software applications, computational instance 702 may be configured to determine expected computational resource usage for each certification test. The expected execution time for a given certification test may include a mean execution time and a standard deviation of the execution time, among other statistical metrics, and may be conditioned on the version of the computational environment (e.g., a given test might take, on average, 30 seconds to run in a first version of the computational environment but 2 minutes in a second different version of the computational environment). The expected computing resource usage may be similarly represented.

Thus, in some implementations, computational instance 700 may provide, along with the request for certification tests at arrow 706, a desired certification testing time or desired computing resource usage time. For example, during early stages of development of the software application, computational instance 700 may be used to request a subset of certification tests expected to execute in under 2 minutes, allowing for quick but less thorough testing. In later stages of development, however, computational instance may be used to request a subset of certification tests expected to execute in under 5 minutes and which, as a result, might provide more complete testing of the software application. In response, computational instance 702 may determine a subset of certification tests expected or planned to execute in under or around the desired certification testing time on the version of the computational environment of computational instance 700. Alternatively, in some implementations, computational instance 702 may transmit the expected execution time and computing resource usage for each certification test along with the transmitted subset of certification tests. Computational instance 700 may then be used to selected, from the subset of certification tests and based on the expected execution times and computing resource usages thereof, a group of certification tests that meets a desired testing time and computing resource usage.

Yet further, computational instance 702 may use the report to determine and track frequencies with which different certification tests are failed, generate errors, and/or generate warnings. These failure, error, and/or warning frequencies may be used by, for example, the application store administrator to develop one or more suggested solutions for each of any frequently-failed certification tests (e.g., failing, generating an error, or generating a warning more frequently than a threshold frequency). Thus, computational instance 702 may be configured to transmit the suggested solutions, or hyperlinks thereto, to computational instance 700 either along with the certification tests at arrow 710 or in response to receiving the report from computational instance 700 at arrow 714.

The report of certification test results may also be used by the software developer to modify the software application using computational instance 700, as indicated by block 718. Specifically, the software developer may review the report to identify any certification tests that have not been passed, review any error or warning messages generated by the certification tests that have not been passed, and revise or modify the software application to remedy the errors or warnings in further testing. Notably, an error or warning generated by a certification test might indicate (i) a flaw in the functionality of the software application and/or (ii) an incompatibility between a manner in which a functionality of the software application is actually implemented and a manner in which the functionality should be implemented in view of the rules and standards set forth by the application platform. Thus, while some errors might indicate an incorrectly-functioning application, others may indicate a preference for alternative designs for the desired functionality of the software application.

Further testing may involve executing the subset of certification tests against the revised software application. However, in some cases, computational instance 700 may request, and computational instance 702 may provide, a revised subset of certification tests to be used in further certification testing of the revised software application.

Figure 8:
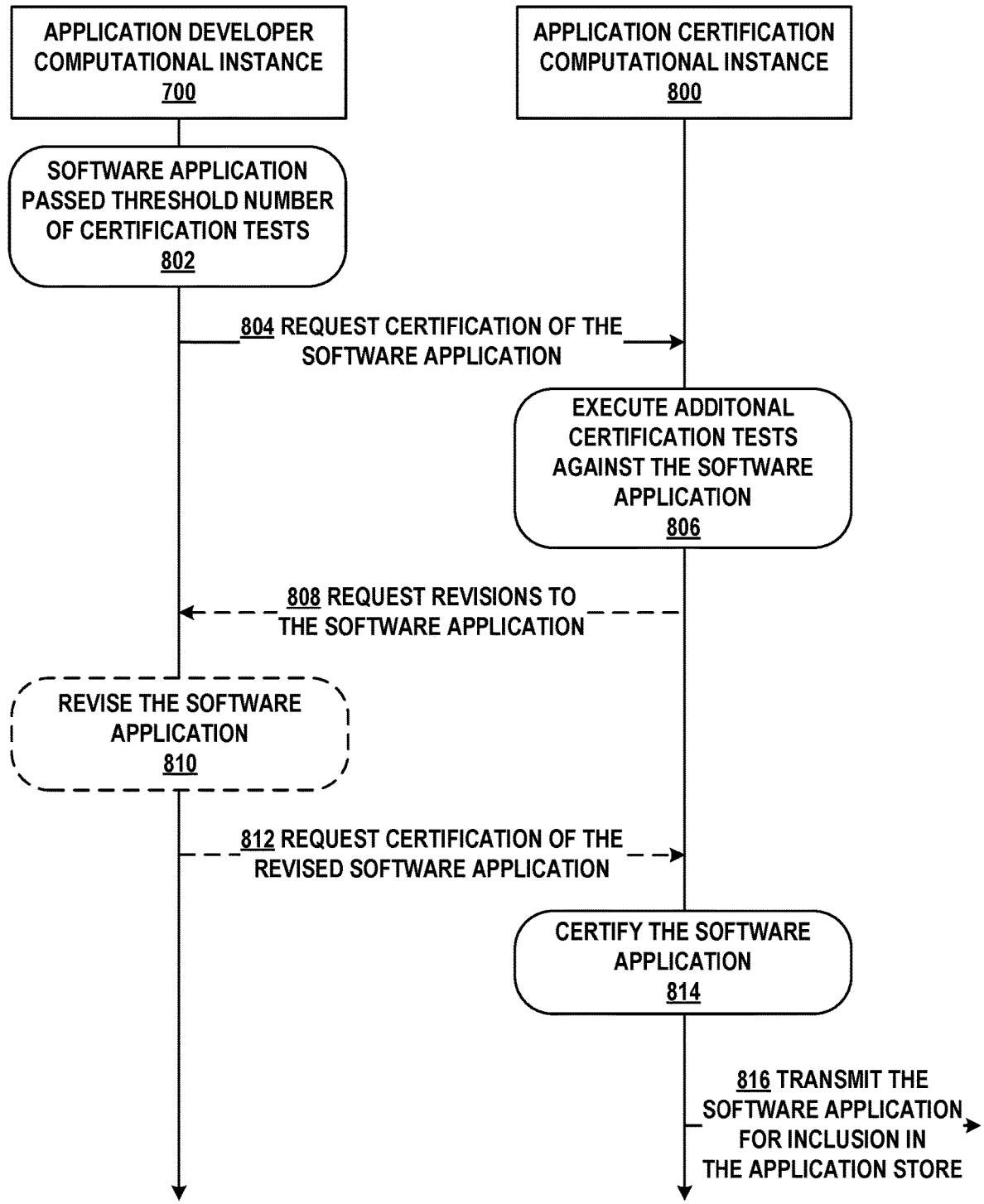
FIG. 8 is a message flow diagram, in accordance with example embodiments.

FIG. 8 illustrates how official certification testing may be carried out in combination with the independent certification testing performed on computational instance 700. Namely, computational instance 700 may be configured to allow for repeated execution of the subset of certification tests. Once the software application passes at least a threshold number of the certification tests (e.g., 50%, 80%, or 100%), as indicated by block 802 of FIG. 8, computational instance 700 may be configured to allow the software developer to request official certification of the software application, as indicated by arrow 804. Certification testing by computational instance 800 may be referred to as official or final certification testing due to being performed under the control or supervision of an administrator of the application store, rather than being performed independently by the software application developer.

The request for official or final certification may be transmitted to application certification computational instance 800, which may be one of a plurality of available application certification testing computational instances. Application certification computational instance 800 may provide a version of the computing environment that is identical or very similar to the version of the computational environment provided by computational instance 700.

Application store computational instance 702 may be configured to select computational instance 800, rather than another application certification computational instance, for official certification testing of the software application based on the version of the computational environment provided by computational instance 700. An identifier of computational instance 800 may be transmitted to computational instance 700 from computational instance 702 along with the subset of certification tests at arrow 710 or, alternatively, at a later point in time. Based on this identifier, computational instance 700 may be configured to transmit the request for official certification of the software application to computational instance 800, rather than another computational instance, once at least the threshold number of certification tests has been passed by the software application on computational instance 700. By using a computational instance with an identical or similar version of the computational environment, the number of false errors and warnings may be reduced, thereby facilitating the certification process. However, in some embodiments, the official certification testing may also be carried out by a computational instance with a different version of the computational environment than computational instance 700 (e.g., application store computational instance 702).

The request for official certification of the software application may include therein the software application to be certified so that it may be executed by computational instance 800. In response to or based on the request for official certification testing, computational instance may execute certification tests against the software application, as indicated by block 806. Notably, the official certification process may involve computational instance 800 executing against the software application additional certification tests beyond the initial subset of certification tests already executed by computational instance 700. Additionally, computational instance 800 may verify that the software application passes the initial subset of certification tests either by reviewing the report of certification test results generated by computational instance 700 or by re-executing each of the subset of certification tests against the software application. The additional tests executed by computational instance 800 may test the same rules and standards tested by the initial subset of certification tests (i.e., provided at arrow 710) and/or additional rules and standards not already tested.

In response to or based on errors or warnings (e.g., when more than a threshold number of errors and/or a threshold number of warnings are generated) resulting from execution of the additional certification tests or the initial subset of certification tests, computational instance 800 may transmit, to computational instance 700, a request for revisions to the software application, as indicated by arrow 808. In response to or based thereon, the software application may be revised using computational instance 700, as indicated by block 810, and transmitted back to computational instance 800 for further certification testing, as indicated by arrow 812. The revision process (block 810 and arrows 808 and 812) may be repeated until the software application passes a threshold number of certification test (e.g., 80%, 100%) and becomes certified for inclusion of the application store, as indicated by block 814. The threshold number of certification tests needed to be passed to certify the software application for inclusion in the application store (i.e., the second threshold number) may be the same as or different from the threshold number of certification testes needed to be passed to submit the software application for official certification testing (i.e., the first threshold number). Each threshold may be expressed either as an absolute number or as a fraction of the total number of executed certification tests.

Based on the software application being certified for inclusion in the application store, the software application may be transmitted to the application store, as indicated by arrow 816, to be made available therein for download by other computing devices or computational instances. The application store may be provided by application store computational instance 702 and/or one or more other computational instances within remote network management platform 320. In some implementations, the software application may be downloadable and executable only on computing devices or computational instances having the same or similar version of the computational environment as computational instance 700.

FIG. 9 illustrates example mappings between different computational environment versions and certification tests for software applications. Computational environment version 900, for example, is mapped to certification tests 902, 904, 906, and 908 through 910. Certification tests 902, 904, 906, and 908 through 910 are thus adapted to computational environment version 900 by, for example, utilizing operating system calls corresponding to computational environment version 900, verifying security policies specific to computational environment version 900, utilizing application programming interfaces (APIs) corresponding to computational environment version 900, accessing databases specific to computational environment version 900, and utilizing plugins active in computational environment version 900, among other version-specific properties. Certification tests 908 and 910, for example, verify that plugins 909 and 911, respectively, are appropriately invoked by the software application.

Similarly, computational environment version 912 is mapped to certification tests 914, 916, 918, and 920 through 922, each of which are adapted to computational environment version 912. Certification test 918 evaluates an application's usage of plugins 917 and 919 while certification test 922 evaluates the application's usage of plugin 923. Additionally, computational environment version 924 is mapped to certification tests 926, 928, 930, and 932 through 934, each of which are adapted to computational environment version 924. Certification test 926 evaluates an application's usage of plugins 925 and 927 while certification test 932 evaluates the application's usage of plugin 933. Further, computational environment version 936 is mapped to certification tests 938, 940, 942, and 944 through 946, each of which are adapted to computational environment version 936. Certification test 938 evaluates an application's usage of plugins 937 and 939.

The mapping may additionally include, for each respective certification test reflected therein, other data describing the properties of the respective certification test such as, for example, execution time, memory usage, parallelizability, software libraries used during testing, as well as any other data that may be gathered based on execution of the respective certification test. Accordingly, when a new computational environment version is added to the mapping, certification tests that match or are adapted to the new version of the computational environment may be determined based on the data associated with each certification test. The new version of the computational environment may thus be automatically mapped to any compatible certification tests.

VI. Example Operations

Figure 10:
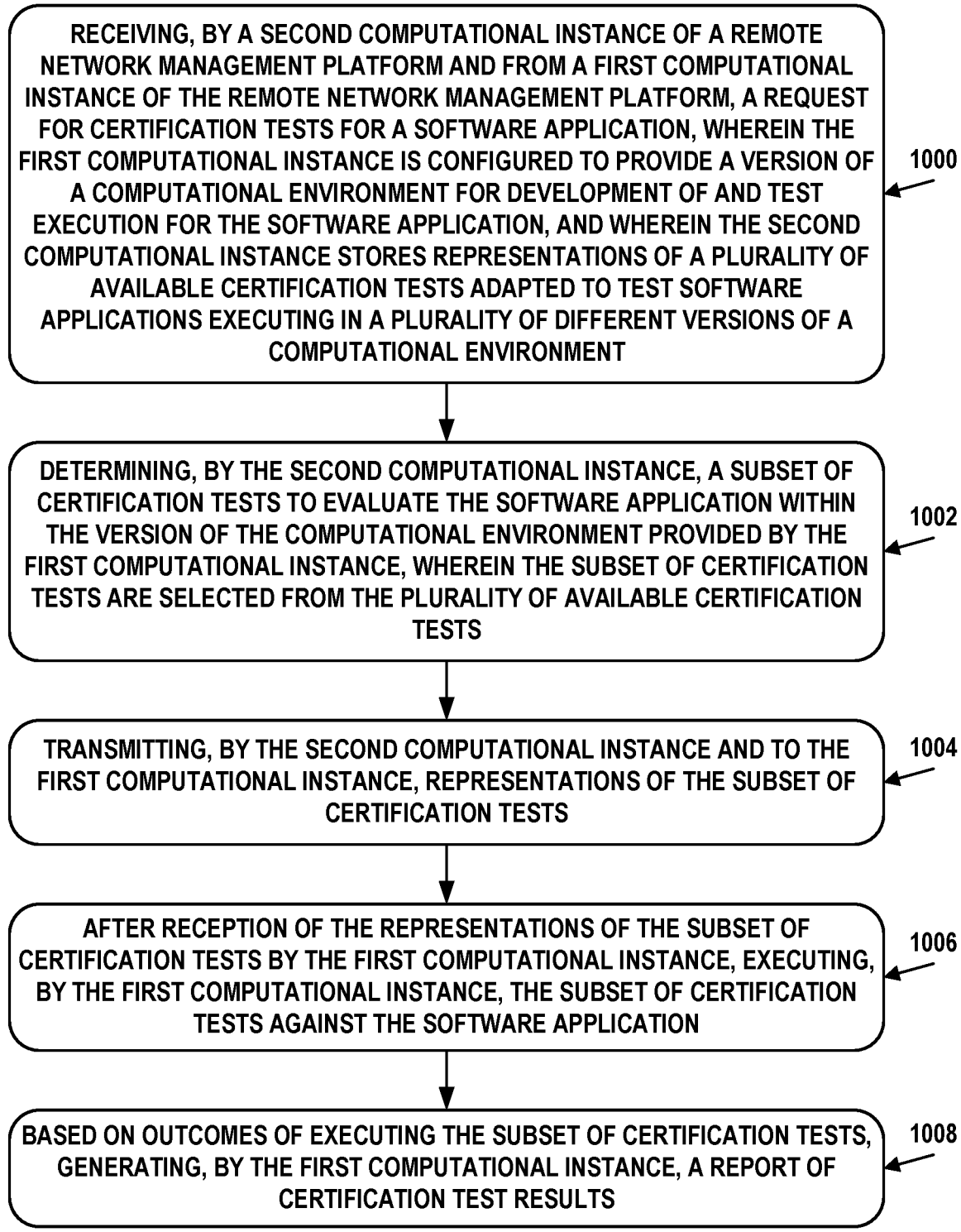
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves receiving, by a second computational instance of a remote network management platform and from a first computational instance of the remote network management platform, a request for certification tests for a software application. The first computational instance is configured to provide a version of a computational environment for development of and test execution for the software application. The second computational instance stores representations of a plurality of available certification tests adapted to test software applications executing in a plurality of different versions of a computational environment.

Block 1002 involves determining, by the second computational instance, a subset of certification tests to evaluate the software application within the version of the computational environment provided by the first computational instance. The subset of certification tests are selected from the plurality of available certification tests.

Block 1004 involves transmitting, by the second computational instance and to the first computational instance, representations of the subset of certification tests.

Block 1006 involves, after reception of the representations of the subset of certification tests by the first computational instance, executing, by the first computational instance, the subset of certification tests against the software application.

Block 1008 involves, based on outcomes of executing the subset of certification tests, generating, by the first computational instance, a report of certification test results.

In some embodiments, a third computational instance of the remote network management platform may be configured to provide further testing of the software application by way of execution of additional certification tests of the plurality of available certification tests. The first computational instance may be further configured to determine that the report of the certification test results indicates that at least a threshold number of the subset of certification tests have passed and transmit the software application to the third computational instance.

In some embodiments, the threshold number may be a first threshold number. The third computational instance is further configured to determine that the software application has passed at least a second threshold number of the additional certification tests. Based on determining that the software application has passed at least the second threshold number of the additional certification tests, the third computational instance may be configured to certify the software application for inclusion in an application store of the remote network management platform. Based on certifying the software application for inclusion in the application store, the software application may be provided in the application store.

In some embodiments, the second computational instance may be configured to provide the application store.

In some embodiments, the third computational instance and the first computational instance may each provide an identical version of the computational environment.

In some embodiments, the first computational instance may be configured to generate and transmit the request for certification tests for the software application. The request may include an identification of software plugins active in the version of the computational environment. The second computational instance may be configured to determine the subset of certification tests based on the software plugins active in the version of the computational environment.

In some embodiments, the first computational instance may be configured to generate and transmit the request for certification tests for the software application. The request may include an identification of software plugins utilized by the software application. The second computational instance may be configured to determine the subset of certification tests based on the software plugins utilized by the software application.

In some embodiments, the first computational instance may be configured to generate the request for certification tests for the software application by including therein the version of the computational environment provided by the first computational instance.

In some embodiments, the first computational instance may be further configured to transmit the report of certification test results to the second computational instance. The second computational instance may be further configured to modify, based on the report of certification test results, the subset of certification tests for evaluating other software applications within the version of the computational environment at a future time.

In some embodiments, the first computational instance may be further configured to transmit the report of certification test results to the second computational instance. The second computational instance may be further configured to modify, based on the report of certification test results, one or more certification tests of the plurality of available certification tests.

In some embodiments, the first computational instance may be further configured to transmit the report of certification test results to the second computational instance. The second computational instance may be further configured to identify, based on the report of certification test results, an error within source code of a first certification test of the subset of certification tests and generate an error message identifying the error within the source code of the first certification test.

In some embodiments, the second computational instance may be further configured to update the subset of certification tests by removing therefrom the first certification test and transmit, to the first computational instance, the updated subset of certification test for further testing of the software application.

In some embodiments, the first computational instance may be further configured to transmit the report of certification test results to the second computational instance. The second computational instance may be further configured to determine, based on a plurality of reports of certification test results received from a plurality of computational instances providing the version of the computational environment, a group of frequently-failed certification tests from the plurality of available certification tests. For each respective certification test of the group of frequently-failed certification tests, a suggested solution for addressing a cause of failure of the respective certification test may be provided.

In some embodiments, the second computational instance may be further configured to receive a plurality of reports of certification test results from a plurality of computational instances providing the version of the computational environment. Each respective report of the plurality of reports may include execution times of a plurality of certification test. The second computational instance may be yet further configured to determine, based on the execution times of the plurality of certification test contained in each respective report, a further subset of certification tests to evaluate the software application by selecting a group of certification tests planned to execute within the version of the computational environment in under a threshold period of time.

In some embodiments, a system may involve means for receiving, by a second computational instance of a remote network management platform and from a first computational instance of the remote network management platform, a request for certification tests for a software application. The first computational instance may be configured to provide a version of a computational environment for development of and test execution for the software application. The second computational instance may store representations of a plurality of available certification tests adapted to test software applications executing in a plurality of different versions of a computational environment. The system may also involve means for determining a subset of certification tests to evaluate the software application within the version of the computational environment provided by the first computational instance. The subset of certification tests may be selected from the plurality of available certification tests. The system may additionally involve means for transmitting, from the second computational instance and to the first computational instance, representations of the subset of certification tests. The system may further involve means for, after reception of the representations of the subset of certification tests by the first computational instance, executing the subset of certification tests against the software application. The system may yet further involve means for, based on outcomes of executing the subset of certification tests, generating a report of certification test results.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    one or more first server devices configured to host a first computational instance of a remote network management platform configured to provide a version of a computational environment for development of and test execution for a software application; and one or more second server devices configured to host a second computational instance of the remote network management platform storing representations of a plurality of available certification tests adapted to test software applications executing in a plurality of different versions of the computational environment, wherein the second computational instance is configured to:

receive, from the first computational instance, a request for certification tests for the software application for inclusion in an application store, wherein the request includes information about the software application;

determine, based on the information about the software application, a subset of certification tests to evaluate the software application within the version of the computational environment provided by the first computational instance, wherein the subset of certification tests are selected from the plurality of available certification tests;

transmit, to the first computational instance, representations of the subset of certification tests, wherein, after reception of the representations of the subset of certification tests, the first computational instance is configured to: (i) execute the subset of certification tests against the software application and (ii) based on outcomes of executing the subset of certification tests, generate a report of certification test results;

receive, from the first computational instance, the software application and the report of the certification test results, wherein the report of the certification test results indicates that the software application passed the subset of certification tests; and list the software application in the application store.

2. The computing system of claim 1, further comprising:
one or more third server devices configured to host a third computational instance of the remote network management platform configured to provide further testing of the software application by way of execution of additional certification tests of the plurality of available certification tests;

wherein the first computational instance is further configured to:

determine that the report of the certification test results indicates that at least a threshold number of the subset of certification tests have passed; and transmit the software application to the third computational instance.

3. The computing system of claim 2, wherein the threshold number is a first threshold number, wherein the third computational instance is further configured to:

determine that the software application has passed at least a second threshold number of the additional certification tests; and based on determining that the software application has passed at least the second threshold number of the additional certification tests, certify the software application for inclusion in an application store of the remote network management platform.

4. The computing system of claim 3, wherein the second computational instance is configured to provide the application store.

5. The computing system of claim 2, wherein the third computational instance and the first computational instance each provide an identical version of the computational environment.

6. The computing system of claim 1, wherein the first computational instance is configured to generate and transmit the request for certification tests for the software application, wherein the request comprises an identification of software plugins active in the version of the computational environment, and wherein the second computational instance is configured to determine the subset of certification tests based on the software plugins active in the version of the computational environment.

7. The computing system of claim 1, wherein the first computational instance is configured to generate and transmit the request for certification tests for the software application, wherein the request comprises an identification of software plugins utilized by the software application, and wherein the second computational instance is configured to determine the subset of certification tests based on the software plugins utilized by the software application.

8. The computing system of claim 1, wherein the first computational instance is configured to generate the request for certification tests for the software application by including therein the version of the computational environment provided by the first computational instance.

9. The computing system of claim 1, wherein the first computational instance is further configured to transmit the report of certification test results to the second computational instance, and wherein the second computational instance is further configured to modify, based on the report of certification test results, the subset of certification tests for evaluating other software applications within the version of the computational environment at a future time.

10. The computing system of claim 1, wherein the first computational instance is further configured to transmit the report of certification test results to the second computational instance, and wherein the second computational instance is further configured to modify, based on the report of certification test results, one or more certification tests of the plurality of available certification tests.

11. The computing system of claim 1, wherein the first computational instance is further configured to transmit the report of certification test results to the second computational instance, and wherein the second computational instance is further configured to:

identify, based on the report of certification test results, an error within source code of a first certification test of the subset of certification tests; and generate an error message identifying the error within the source code of the first certification test.

12. The computing system of claim 11, wherein the second computational instance is further configured to:

update the subset of certification tests by removing therefrom the first certification test; and transmit, to the first computational instance, the updated subset of certification test for further testing of the software application.

13. The computing system of claim 1, wherein the first computational instance is further configured to transmit the report of certification test results to the second computational instance, and wherein the second computational instance is further configured to:

determine, based on a plurality of reports of certification test results received from a plurality of computational instances providing the version of the computational environment, a group of frequently-failed certification tests from the plurality of available certification tests; and for each respective certification test of the group of frequently-failed certification tests, provide a suggested solution for addressing a cause of failure of the respective certification test.

14. The computing system of claim 1, wherein the second computational instance is further configured to:

receive a plurality of reports of certification test results from a plurality of computational instances providing the version of the computational environment, wherein each respective report of the plurality of reports comprises execution times of a plurality of certification test; and determine, based on the execution times of the plurality of certification test contained in each respective report, a further subset of certification tests to evaluate the software application by selecting a group of certification tests planned to execute within the version of the computational environment in under a threshold period of time.

15. A method comprising:

receiving, by a second computational instance of a remote network management platform hosted on one or more second server devices and from a first computational instance of the remote network management platform hosted on one or more first server devices, a request for certification tests for a software application for inclusion in an application store, wherein the request includes information about the software application, wherein the first computational instance is configured to provide a version of a computational environment for development of and test execution for the software application, and wherein the second computational instance stores representations of a plurality of available certification tests adapted to test software applications executing in a plurality of different versions of a computational environment;

determining, based on the information about the software application, by the second computational instance, a subset of certification tests to evaluate the software application within the version of the computational environment provided by the first computational instance, wherein the subset of certification tests are selected from the plurality of available certification tests;

transmitting, from the second computational instance to the first computational instance, representations of the subset of certification tests;

after reception of the representations of the subset of certification tests by the first computational instance, executing, by the first computational instance the subset of certification tests against the software application; and based on outcomes of executing the subset of certification tests, generating, by the first computational instance, a report of certification test results;

receiving, from the first computational instance, the software application and the report of the certification test results, wherein the report of the certification test results indicates that the software application passed the subset of certification tests; and listing the software application in the application store.

16. The method of claim 15, further comprising:

determining, by the first computational instance, that the report of the certification test results indicates that at least a threshold number of the subset of certification tests have passed;

transmitting the software application to a third computational instance of the remote network management platform hosted on one or more third server devices; and providing, by the third computational instance, further testing of the software application by way of execution of additional certification tests of the plurality of available certification tests.

17. The method of claim 16, wherein the threshold number is a first threshold number, and wherein the method further comprises:

determining that the software application has passed at least a second threshold number of the additional certification tests; and based on determining that the software application has passed at least the second threshold number of the additional certification tests, certifying the software application for inclusion in an application store of the remote network management platform.

18. The method of claim 15, wherein the request comprises an identification of software plugins active in the version of the computational environment, and wherein the subset of certification tests is determined based on the software plugins active in the version of the computational environment.

19. The method of claim 15, further comprising:

transmitting, by the first computational instance, the report of certification test results to the second computational instance; and modifying, based on the report of certification test results and by the second computational instance, the subset of certification tests for evaluating other software applications within the version of the computational environment at a future time.

20. An article of manufacture including a non-transitory computer-readable medium, having stored thereon program instructions that, upon execution by a computing system, cause the computing system to perform operations comprising:

receiving, by a second computational instance of the computing system and from a first computational instance of the computing system, a request for certification tests for a software application, wherein the request includes information about the software application, wherein the first computational instance is configured to provide a version of a computational environment for development of and test execution for the software application, and wherein the second computational instance stores representations of a plurality of available certification tests adapted to test software applications executing in a plurality of different versions of a computational environment;

determining, based on the information about the software application, by the second computational instance, a subset of certification tests to evaluate the software application within the version of the computational environment provided by the first computational instance, wherein the subset of certification tests are selected from the plurality of available certification tests;

transmitting, by the second computational instance and to the first computational instance, representations of the subset of certification tests after reception of the representations of the subset of certification tests by the first computational instance, executing, by the first computational instance, the subset of certification tests against the software application; and based on outcomes of executing the subset of certification tests, generating, by the first computational instance generate a report of certification test results;

receiving, from the first computational instance, the software application and the report of the certification test results, wherein the report of the certification test results indicates that the software application passed the subset of certification tests; and listing the software application in the application store.

\* \* \* \* \*